United States Patent

Anderson et al.

[11] 3,719,194
[45] March 6, 1973

[54] BREAKAWAY COUPLING

[75] Inventors: Dean M. Anderson, Lakewood; Ross E. Burbick, Bellflower, both of Calif.

[73] Assignee: E. B. Wiggens, Inc., Los Angeles, Calif.

[22] Filed: Sept. 23, 1971

[21] Appl. No.: 183,065

[52] U.S. Cl. ........................... 137/68, 137/614.03
[51] Int. Cl. .................................. F16k 17/40
[58] Field of Search ............... 137/68–71, 614.03

[56] References Cited

UNITED STATES PATENTS

| | | | |
|---|---|---|---|
| 2,666,656 | 1/1954 | Bruning | 137/614.04 X |
| 2,898,926 | 8/1959 | Tsiguloff | 137/68 |
| 2,910,080 | 10/1959 | Wright et al. | 137/68 X |
| 3,312,431 | 4/1967 | Vogt | 137/68 X |
| 3,319,642 | 5/1967 | Fox | 137/68 |
| 3,630,214 | 12/1971 | Levering | 137/68 |

*Primary Examiner*—Edgar W. Geoghegan
*Assistant Examiner*—Richard Gerard
*Attorney*—Paul A. Weilein

[57] ABSTRACT

A breakaway coupling has two confronting bodies, each equipped with a spring-loaded valve that is normally held open by a trigger that releases in response to slight separation movement of the two bodies. The two bodies are united by a frangible sleeve that is anchored to the two bodies respectively by frangible pins. The pins yield to purely axial separation force between the two bodies and the sleeve yields to shear and bending forces.

18 Claims, 6 Drawing Figures

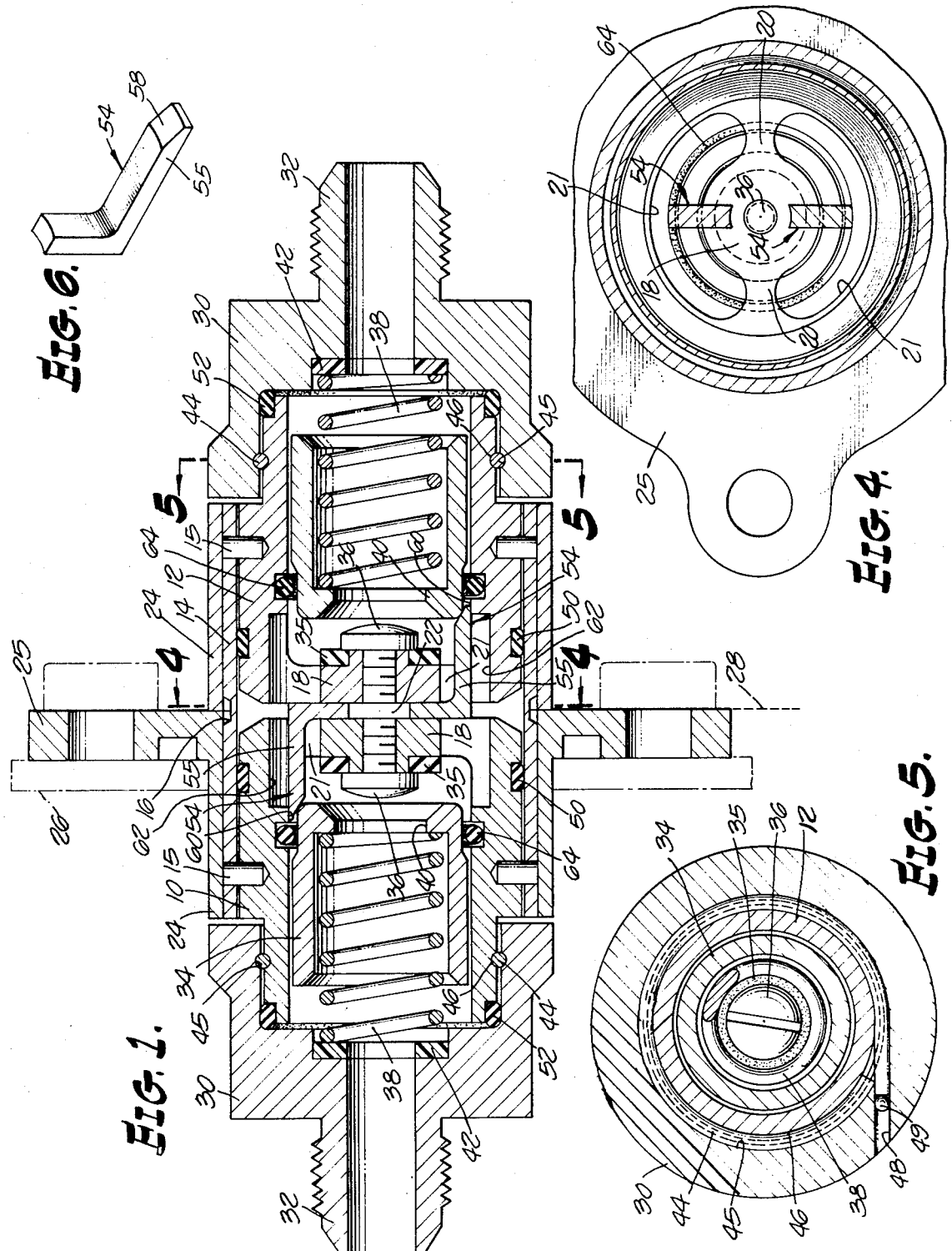

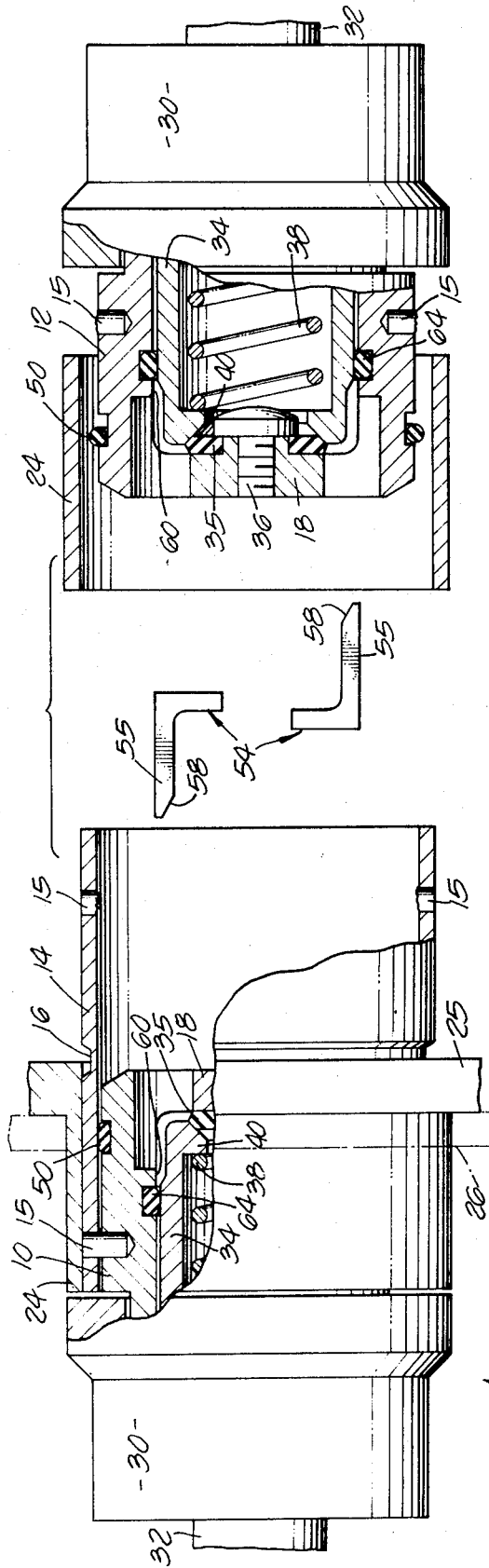
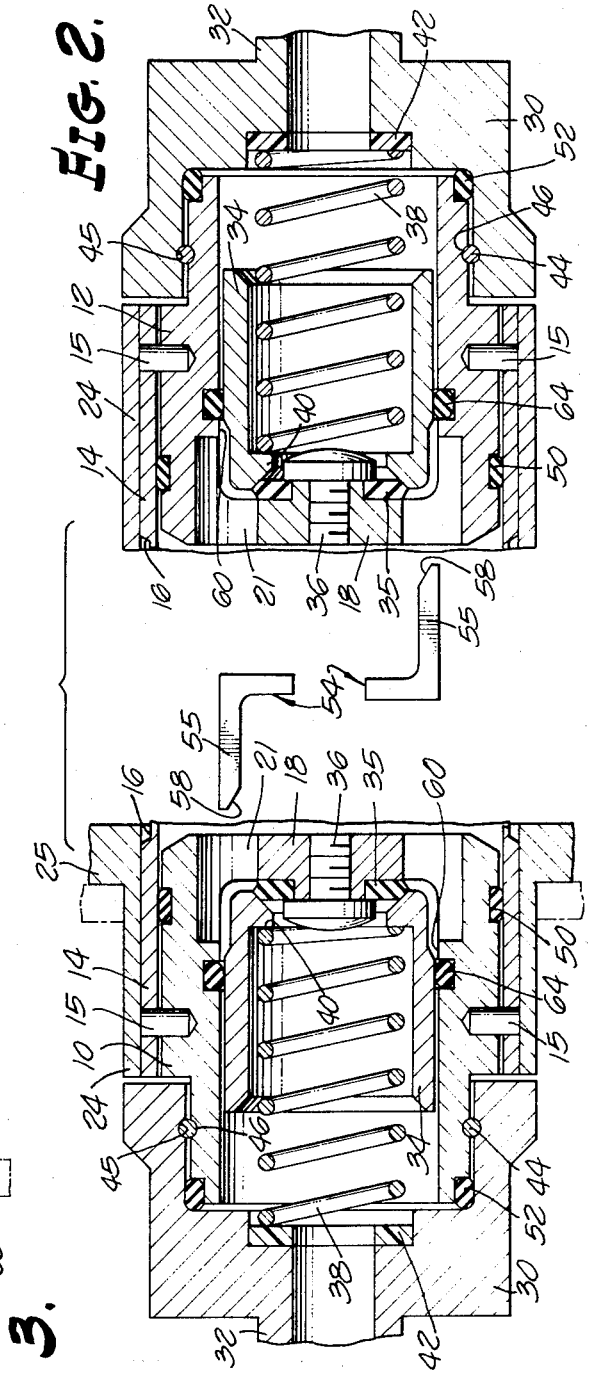

BREAKAWAY COUPLING

BACKGROUND OF THE INVENTION

There is need in various situations for what is commonly termed a crashworthy valve that will close a fluid line automatically when the fluid line is broken or damaged by excessive external impact. For example, if a nozzle-equipped fuel hose at a service station is accidentally torn loose by an automobile, an impact-responsive valve in the fuel line would close automatically to avoid excessive fuel spillage. In such a situation a single impact-responsive valve suffices to cut off flow from the fuel tank to the hose. Breakaway couplings incorporating single impact-responsive valves for this purpose are disclosed, for example, in the following U.S. Pat. Nos. Tsiguloff 2,898,926; Wright et al. 2,910,080; Vogt 3,312,431; and Fox 3,319,642.

There is a pressing need to cut down the loss of life and equipment by fuel spillage when a helicopter crashes. In a helicopter, however, two impact-responsive valves are required to prevent fuel flow from opposite directions to the point where the fuel line is damaged or severed. For this purpose two valves are commonly incorporated in a single breakaway coupling and such breakaway couplings are installed at strategic points in the helicopter fuel system. Such dual valves are disclosed, for example, in the following U.S. Pat. Nos.: Bruning 2,666,656; Clark 3,273,578; and McCullough 3,454,024.

One requisite for such a breakaway coupling is that the two impact-responsive valves incorporated therein have no tendency to hang up in partially closed positions. Another requirement is that the breakaway coupling be sensitive in the sense of providing relatively large valve-closing movements in response to relatively small impact-caused yielding action by the coupling structure. Thus, each of the two valves in the coupling should have a high spring load to close with a snap action in response to a suitable sensitive trigger mechanism.

It is also requisite that a breakaway coupling be versatile to respond to different kinds of destructive forces. Thus, such a breakaway coupling should respond to excessive axial separation forces, excessive shear forces, excessive forces that bend the fuel line, as well as various combinations of such forces.

SUMMARY OF THE INVENTION

A broad object of the invention is to provide an impact-responsive coupling incorporating two valves that meet the foregoing requirements of sensitive trigger action, positive closing action, and responsiveness to tension loads, shear loads, and bending loads.

To attain this broad object, the invention provides two separate confronting coupling bodies on opposite sides of a transverse plane. The two bodies are formed with confronting noses of reduced diameter with a small clearance space between the confronting noses. Each nose is supported by a spider that provides space for fluid flow past the nose when the valve is open.

Each nose has an inner side that is equipped with a fixed valve seat for cooperation with a corresponding tubular valve member. Each tubular valve member is urged towards closed position by a relatively heavy coil spring but is normally held in retracted open position by a latch or trigger member that extends through the spider to the clearance space between the two confronting noses. Preferably, the two spiders of the two valves are diametrically opposite from each other. The two confronting coupling bodies are held together by frangible means that yields in response to destructive impact forces thereby to permit relative separation movement between the two confronting valve bodies, the two trigger members being highly sensitive to such separation movement.

The frangible means for holding the two confronting coupling bodies together may take various forms in various practices of the invention. In the preferred embodiment disclosed herein, a frangible sleeve is telescoped over the confronting ends of the two bodies and is anchored to the two bodies respectively by frangible pins. The frangible sleeve may be weakened in the region of the aforementioned transverse plane.

In such an arrangement it is contemplated that the frangible pins that anchor the frangible sleeve to the two bodies will yield in response to axial impact forces and thus trigger the closing movement of the two valves. It is further contemplated that the frangible sleeve will yield by rupture in response to shear forces across the coupling as well as in response to bending forces at the coupling thereby to release the trigger members to cause the two valves to snap closed.

One feature of the invention is that only the frangible sleeve and the two trigger members intersect the aforementioned transverse plane, all of the other parts of the coupling lying on opposite sides of that plane.

Another feature of the invention is that the ends of the trigger members that are in abutment with the retracted valve members are bevelled so that the spring force that is transmitted to each trigger member is resolved into two components. One component is an axial component that urges the trigger member in one coupling body against the nose of the other coupling body. The other component is a radially outward component that urges the trigger member radially outwardly away from the path of closing movement of the valve member.

When a valve member snaps to closed position it must be snugly embraced by an annular sealing ring to prevent fluid leakage along its periphery. A further feature of the invention in this regard is the concept of reducing the outside diameter of the valve member in the region of the valve member that registers with the annular sealing means when the valve is closed. Thus, when the closing movement of the tubular valve member is initiated, the annular sealing means only lightly touches the valve sleeve if at all, so that the annular sealing means does not create any significant degree of static friction resistance to the initial closing movement of the valve. As the closing movement progresses, however, a portion of the valve member of greater diameter enters the annular sealing means to expand the annular sealing means and thus create effective sealing pressure between the sealing means and the valve member.

The above and other features and advantages of the invention will be apparent from the following detailed description and the accompanying drawings.

BRIEF DESCRIPTION OF THE DRAWINGS

In the drawings, which are to be regarded as merely illustrative:

FIG. 1 is an axial section of the presently preferred embodiment of the invention;

FIG. 2 is a view in axial section showing how the frangible sleeve ruptures in response to either an excessive external shear force at the coupling or an excessive external bending force at the coupling;

FIG. 3 is a view similar to FIG. 2 showing how at least one set of the frangible pins yields in response to an excessive axial separation force to cause the two valves of the coupling to close;

FIG. 4 is a transverse section along the line 4—4 of FIG. 1 showing how the nose of a valve body is connected with the rest of the valve body by a pair of spider legs;

FIG. 5 is a transverse section taken along the line 5—5 of FIG. 1 showing how an end member is mounted on each valve body and is secured thereon by a retaining wire; and FIG. 6 is a perspective view of one of the two trigger members.

DESCRIPTION OF THE PREFERRED EMBODIMENT

Referring to FIG. 1, the breakaway coupling incorporates two separate confronting coupling bodies 10 and 12 through which fluid is normally free to flow. The two coupling bodies are interconnected by a frangible sleeve 14 which is anchored to each of the two bodies respectively by frangible pins 15. Although the frangible sleeve may be made of relatively ductile material in some embodiments of the invention, in this instance it is made of relatively brittle material. Preferably the frangible sleeve 14 is weakened by an outer circumferential groove 16. Each of the two coupling bodies has a nose 18 which is a central part of a spider that is integrally connected to the coupling body by a pair of spider legs 20 which are best shown in FIG. 4, the two spider legs forming two spaces 21 for fluid flow. The two confronting noses are separated by a narrow radial space 22.

Two outer protective sleeves 24 embrace the frangible sleeve 14 on opposite sides of the circumferential groove 16 and one of the two protective sleeves is formed with a radial flange 25 by means of which the coupling may be secured to a bulkhead 26. The outer face of the flange 25 defines a transverse plane which is indicated by the dotted line 28. This transverse plane bisects the circumferential groove 16 of the frangible sleeve 14 and each of the two coupling bodies 10 and 12 lies wholly on one side of the transverse plane. Two end fittings 30 are telescoped respectively over the outer ends of the two coupling bodies 10 and 12 and each end fitting is formed with an axial nipple portion 32 that is screw threaded for connection to a fluid line.

Each of the two coupling bodies 10 and 12 incorporates a tubular valve member 34 and the inner side of each of the two confronting noses 18 is equipped with an elastomer ring 35 which serves as a seat to cooperate with the corresponding tubular valve member. The elastomer ring 35 may be releasably secured by a screw 36. Each of the two valve members 34 is urged towards closed position against the corresponding valve seat 35 by a corresponding compression spring 38 which thrusts against an inner circumferential flange 40 of the valve member. Each spring 38 backs against a suitable washer 42 which is preferably made of a plastic material which has a low coefficient of friction relative to the material of the end fitting 30 in which it is seated. For example, the washers 42 may be made of tetrafluoroethylene (TFE) or may be made of nylon.

Each of the end fittings 30 is swiveled or freely rotatable relative to the coupling body on which it is mounted and for this purpose each of the end fittings is secured by a circular retaining wire 44, the retaining wire seating in an inner circumferential groove 45 of the end fitting and an outer circumferential groove 46 of the coupling body. As indicated in FIG. 5, each end fitting 30 has an exterior bore 48 which is tangential to the inner circumferential groove 45 to serve as an entrance for the wire 44 in the procedure of assembling the coupling. After a retaining wire 44 is installed, the entrance bore 48 may be plugged, for example, by a steel ball 49.

The coupling is made fluid tight by O-rings 50 that embrace the two coupling bodies respectively inside the frangible sleeve 14 and by O-rings 52 which embrace the two coupling bodies respectively inside the end fittings 30.

The reason for making each of the end fittings 30 rotatable relative to the coupling body on which it is mounted is to keep torque of undue magnitude from being transmitted to the coupling in the course of connecting the end fittings to complementary components of a fluid line. Only moderate resistance to relative rotation of an end fitting is created by the corresponding O-ring 52, and the low friction washers 42 minimize the resistance created by the valve springs 38.

Each of the two valve members 34 is normally held in retracted open position by abutment against a corresponding latch member in the form of an angular trigger 54 that has two arms as shown in FIG. 6. As shown in FIG. 1, the longer arm 55 of each trigger 54 extends longitudinally of the coupling through a previously mentioned space 21 and the shorter arm 56 extends radially inwardly into the radial space 22 between the two noses 18. The valve member 34 in each coupling body abuts the outer end of the longer arm 55 of the corresponding trigger 54 and thus thrusts the trigger against the confronting nose 18 of the other coupling body.

A feature of the invention is that the outer end of the longer arm of each trigger 54 is chamfered to provide an inclined surface 58 against which the corresponding valve member 34 abuts, the result being that reaction to the thrust of the valve member is divided into two components. One component is a longitudinal thrust against the nose 18 of the other valve member and the other component urges the trigger radially outwardly against the inner circumferential surface 60 of the corresponding valve body. It is to be noted in FIG. 1 that the longer arm 55 of each trigger 54 overlaps the corresponding inner circumferential surface 60 by a relatively small dimension, the inner circumferential portion of the coupling body being cut away to provide an annular clearance space 62 around the trigger.

The manner in which the breakaway coupling serves its purpose may be readily understood from the foregoing description. The two valve springs 38 thrusting the two valve members 34 against the two triggers 54 create a separation force of minor magnitude at the transverse plane 28 and, of course, the confined fluid acting between the confronting ends of the two coupling bodies also creates a separation force to place the frangible sleeve 14 under normal tension. It is apparent that the separation force between the two coupling bodies 10 and 12 is resisted both by the frangible sleeve 14 and by the frangible pins 15.

A crash of a helicopter may stress the coupling excessively in axial tension or may stress the coupling excessively in shear or may subject the coupling to an excessive bending stress or may subject the coupling to any combination of these three stresses. With reference to excessive stressing of the coupling in axial tension, it is contemplated that the frangible sleeve 14 will provide greater resistance to the tension stress than the frangible pins 15. Thus, if a purely axial tension stress exceeds the resistance of the frangible pins 15, at least one set of the frangible pins breaks away to permit separation of the two coupling bodies. Initial separation movement of the two bodies allows the two valve members 34 to slide the longer arms 55 of the triggers 54 along the inner circumferential surfaces 60 until the longer arms clear the inner circumferential surfaces and are free to move radially outwardly into the annular clearance spaces 62. With the two triggers 54 out of the way, the two valve members 34 are snapped shut by the corresponding valve springs 38.

Each of the valve members 34 is surrounded by a corresponding O-ring 64 which is seated in a corresponding inner circumferential groove of the corresponding coupling body. A certain problem arises in that the O-ring may tend to adhere to the valve member and thus provide static resistance of such high magnitude as to cause the valve member to stick when it is triggered. A feature of the invention is that this problem is solved by reducing the outside diameter of each of the valve members 34 in the region of the valve member that normally registers with the O-ring 64. Thus, it is only after the closing movement of each valve member is well initiated that the valve member makes pressure contact with the corresponding O-ring 64.

If the coupling is subjected to excessive shear stress, the portion of the frangible sleeve 14 that is weakened by the outer circumferential groove 16 ruptures readily to permit separation movement of the two coupling bodies with consequent triggering of the two valve members 34.

If the coupling is subjected to an excessive bending stress the region of the relatively brittle frangible sleeve 14 that lies outwardly of the bend is subjected to tension to cause rupture of the frangible sleeve and in this regard a feature of the invention is that the confronting ends of the two outer protective sleeves 24 abut to serve as a fulcrum to promote the tension in the frangible sleeve in the region outwardly of the bend. Thus, the relatively brittle frangible sleeve tends to rupture abruptly in response to an excessive bending stress.

The description of the preferred embodiment of the invention in specific detail will suggest various changes, substitutions and other departures from the disclosure within the spirit and scope of the appended claims.

We claim:

1. In a breakaway coupling for use in a fluid line, the combination of:

two confronting bodies to function as two adjacent portions of the fluid line;

a sleeve embracing the confronting ends of the two bodies in a fluid-tight manner;

means anchoring the sleeve to the two bodies respectively, said anchoring means being frangible to release in response to excessive axial separation force between the two bodies thereby to permit separation movement between the two bodies;

a normally open valve in at least one of the two bodies to cut off flow therethrough, said valve being biased to closed position; and means to hold the valve open in opposition to the bias of the valve, said holding means being releasable in response to relative separation movement of the two bodies.

2. A combination as set forth in claim 1 in which said sleeve is frangible to rupture in response to excessive shear and bending forces thereby to release the two bodies for separation movement relative to each other.

3. A combination as set forth in claim 2 in which said sleeve has higher resistance than said anchoring means to rupture in response to an axial separation force whereby the anchoring means and not the sleeve yields in response to purely axial separation force.

4. A combination as set forth in claim 2 in which the frangible sleeve is weakened in the region of the juncture of the two bodies.

5. A combination as set forth in claim 1 in which said one body is formed with a spider for fluid flow through the spider, said spider forming a nose of the body;

in which said valve includes a valve seat on the inner side of the nose and further includes a valve member slidingly mounted in the one body to seat against the valve seat;

in which spring means biases the valve member to closed position;

and in which said holding means comprises a latch member normally restraining the valve member, said latch member extending through the spider of the one body into abutment with the other of the two bodies, whereby separation movement between the two bodies permits retraction of the latch means to release the valve member.

6. A combination as set forth in claim 5 in which said latch member has a surface in abutment with the valve member to restrain the valve member, said surface being inclined relative to the axis of the coupling in a direction to create both an axial force and a radially outward force on the latch member in reaction to the thrust of the valve member, the radially outward force urging the latch member radially outward from the region of the two confronting bodies.

7. A combination as set forth in claim 5 in which each of said two bodies lies wholly on one side of a transverse plane between the two bodies.

8. A combination as set forth in claim 7 which includes two outer sleeves embracing said frangible sleeve on opposite sides respectively of said transverse plane, one of said sleeves fulcrumming on the end of the other sleeve in response to bending of the coupling thereby to stress the frangible sleeve.

9. A combination as set forth in claim 8 in which said frangible sleeve is relatively brittle to fracture readily in response to the fulcrumming of said one sleeve against said other sleeve.

10. A combination as set forth in claim 9 in which the frangible sleeve is weakened around its circumference in the region of the transverse plane.

11. A combination as set forth in claim 1 in which said valve includes a valve member and a seat therefor, the valve member being normally retracted from the seat;
   in which a stationary elastomeric sealing means surrounds the valve member to seal the valve member in its closed position;
   and in which the portion of the valve member that registers with the annular sealing means at the retracted position of the valve member is of less diameter than the portion that registers with the annular sealing means at the advanced closed position of the valve member thereby to minimize frictional static resistance by the annular sealing means to initial closing movement of the valve member.

12. A combination as set forth in claim 1 in which said one coupling body is equipped with an end fitting that is free to swivel on the one coupling body to minimize the transmission of torque from the end fitting to the body during installation of the coupling;
   in which a coiled compression spring backs against the end fitting to bias the valve to closed position;
   and in which friction-reducing means is interposed between the end fitting and the spring to reduce the resistance by the spring to rotation of the end fitting relative to the body.

13. A combination as set forth in claim 12 in which said friction-reducing means is a washer of a plastic material having the properties that characterize tetrafluoroethylene resin.

14. In a breakaway coupling for use in a fluid line, the combination of:
   two confronting coupling bodies to function as two adjacent portions of the fluid line,
   each of said bodies being formed with a nose of reduced diameter with a space in the body for fluid flow past the nose, each of said noses having an inner side;
   a valve seat mounted in each body on the inner side of the nose thereof;
   a valve member in each body to cooperate with the corresponding valve seat;
   spring means in each body urging the corresponding valve member to closed position against the corresponding valve seat;
   a latch member in each body abutting the corresponding valve member to hold the valve member in retracted open position in opposition to the corresponding spring means,
   the latch member in each of the two bodies extending through said space of the body and between the two noses into abutment with the nose of the other of the two bodies to transmit the thrust of the corresponding spring means to the nose of the other body;
   means to seal off the juncture of the two coupling bodies from the exterior of the coupling; and
   means connecting the two coupling bodies together to hold them in their normal confronting positions,
   said connecting means being frangible to release the two bodies from each other in response to excessive external impact forces, thereby to release the two valve members for closing action by the two spring means.

15. A combination as set forth in claim 14 in which said connecting means is a frangible sleeve telescoped over the two bodies;
   and in which said sealing means comprises two annular sealing means interposed between the frangible sleeve and the two bodies respectively.

16. A combination as set forth in claim 15 which includes two frangible means anchoring the two bodies respectively to the frangible sleeve,
   said sleeve having higher resistance to rupture than said anchoring means whereby the anchoring means and not the sleeve yields in response to purely axial separation forces between the two coupling bodies.

17. A combination as set forth in claim 15 in which each of said two bodies lies wholly on one side of a transverse plane between the two bodies;
   and in which said frangible sleeve is weakened around its circumference in the region of said plane.

18. A combination as set forth in claim 14 in which each of said latch members has two arms, one of the arms extending longitudinally of the coupling in endwise abutment with the corresponding valve member, the other of the two arms extending transversely of the coupling between the confronting noses of the two coupling bodies.

* * * * *